US010029586B2

(12) United States Patent
Hein

(10) Patent No.: US 10,029,586 B2
(45) Date of Patent: Jul. 24, 2018

(54) VEHICLE SEAT WITH ANGLE TRAJECTORY PLANNING DURING LARGE EVENTS

(71) Applicant: ClearMotion Acquisition I LLC, Woburn, MA (US)

(72) Inventor: Travis Lee Hein, Holliston, MA (US)

(73) Assignee: ClearMotion Acquisition I LLC, Woburn, MA (US)

( * ) Notice: Subject to any disclaimer, the term of this patent is extended or adjusted under 35 U.S.C. 154(b) by 240 days.

(21) Appl. No.: 14/934,465

(22) Filed: Nov. 6, 2015

(65) Prior Publication Data

US 2017/0129367 A1  May 11, 2017

(51) Int. Cl.
  *B60N 2/10*  (2006.01)
  *B60N 2/39*  (2006.01)
  (Continued)

(52) U.S. Cl.
  CPC ......... *B60N 2/0244* (2013.01); *B60N 2/0252* (2013.01); *B60N 2/16* (2013.01);
  (Continued)

(58) Field of Classification Search
  CPC ...... B60N 2/0244; B60N 2/0252; B60N 2/26; B60N 2/39; B60N 2002/0268; B60N 2002/0272; B60N 2002/0212
  (Continued)

(56) References Cited

U.S. PATENT DOCUMENTS 3,153,426 A * 10/1964 Milster ................ B60T 11/105
                                                    137/598
5,857,535 A *  1/1999 Brooks .................... B60N 2/39
                                                    180/282
(Continued)

FOREIGN PATENT DOCUMENTS

| GB | 2 313 214 A | 11/1997 |
| WO | 9728981 A1 | 8/1997 |
| WO | 01083261 A1 | 11/2001 |

OTHER PUBLICATIONS

The effects of trunk stimulation on bimanual seated workspace; S. N. Kukke; R. J. Triolo; IEEE Transactions on Neural Systems and Rehabilitation Engineering; Year: 2004, vol. 12, Issue: 2; pp. 177-185.*

(Continued)

*Primary Examiner* — Cuong H Nguyen
(74) *Attorney, Agent, or Firm* — Wolf, Greenfield & Sacks, P.C.

(57) ABSTRACT

Systems and methods for controlling movement of an active payload support system. In one example, a seat system for a vehicle includes a seat, a support structure coupled to the seat and including an actuator configured to move the seat at a command angle relative to a floor of the vehicle responsive to movement of the vehicle, at least one sensor positioned to detect movement of the vehicle, and a controller configured to receive a signal from the at least one sensor, generate a command signal to instruct the actuator to move the seat (Continued)

relative to a floor of the vehicle, determine whether the command signal will cause the seat to exceed a limit, scale the command signal to conform to movement of the vehicle within the limit, and provide a force command to the actuator to move the seat based on the scaled command signal.

25 Claims, 8 Drawing Sheets

(51) Int. Cl.
  *B60N 2/02* (2006.01)
  *B60N 2/16* (2006.01)
(52) U.S. Cl.
  CPC ........ *B60N 2/39* (2013.01); *B60N 2002/0212* (2013.01); *B60N 2002/0268* (2013.01); *B60N 2002/0272* (2013.01)
(58) Field of Classification Search
  USPC ............ 701/49, 37; 180/313, 315, 328, 326; 297/330, 216.1, 217.2
  See application file for complete search history.

(56) References Cited

U.S. PATENT DOCUMENTS

| | | | | |
|---|---|---|---|---|
| 6,068,280 | A * | 5/2000 | Torres | A61G 5/045 180/328 |
| 6,637,816 | B2 * | 10/2003 | Pavlov | B60N 2/0232 297/216.1 |
| 8,095,268 | B2 * | 1/2012 | Parison | B60N 2/501 267/140.11 |
| 9,610,862 | B2 * | 4/2017 | Bonk | B60N 2/0252 |
| 9,758,073 | B2 * | 9/2017 | Knox | B60N 2/39 |
| 9,902,300 | B2 * | 2/2018 | Hein | B60N 2/10 |
| 9,944,206 | B2 * | 4/2018 | Knox | B60N 2/10 |
| 2001/0035600 | A1 * | 11/2001 | St. Clair | B60G 17/018 267/131 |
| 2001/0037169 | A1 * | 11/2001 | Clair | B60G 17/018 701/37 |
| 2004/0089488 | A1 * | 5/2004 | Bremner | B60N 2/002 180/89.13 |
| 2006/0261647 | A1 * | 11/2006 | Maas | B60N 2/0244 297/216.1 |
| 2007/0260383 | A1 | 11/2007 | Sundaram et al. | |
| 2008/0255734 | A1 * | 10/2008 | Altshuller | B60N 2/0244 701/49 |
| 2009/0088930 | A1 * | 4/2009 | Ohtsubo | B60N 2/0252 701/49 |
| 2010/0114420 | A1 * | 5/2010 | Doi | B60N 2/0244 701/31.4 |
| 2011/0172886 | A1 * | 7/2011 | Taira | A61G 5/04 701/49 |
| 2013/0131923 | A1 * | 5/2013 | Tzipman | B62D 24/04 701/38 |
| 2014/0316661 | A1 * | 10/2014 | Parker | B60N 2/39 701/49 |
| 2014/0358378 | A1 * | 12/2014 | Howard | B60N 2/501 701/45 |
| 2015/0081171 | A1 * | 3/2015 | Ericksen | B60G 17/016 701/37 |
| 2016/0101664 | A1 | 4/2016 | Richter | |
| 2016/0101710 | A1 * | 4/2016 | Bonk | B60N 2/0252 297/217.2 |
| 2017/0129367 | A1 * | 5/2017 | Hein | B60N 2/0244 |
| 2017/0129371 | A1 * | 5/2017 | Knox | B60N 2/39 |
| 2017/0129372 | A1 | 5/2017 | Hein et al. | |
| 2017/0129373 | A1 * | 5/2017 | Knox | B60N 2/39 |
| 2018/0022242 | A1 | 1/2018 | Knox | |

OTHER PUBLICATIONS

Research on the Behavior of a Passenger Car in JRS Virtual Testing; Qian Peng et al.; 2013 Fifth International Conference on Measuring Technology and Mechatronics Automation; Year: 2013; pp. 930-933, IEEE Conferences.*

Vehicle Occupant Head Position Quantification Using an Array of Capacitive Proximity Sensors; Nima Ziraknejad et al.; IEEE Transactions on Vehicular Technology; Year: 2015, vol. 64, Issue: 6; pp. 2274-2287.*

Assessment of driver's seating discomfort using interface pressure distribution; Xiaoping Jin et al.; 2009 IEEE Intelligent Vehicles Symposium; Year: 2009; pp. 1419-1424; IEEE Conferences.*

Preparations for a train-to-train impact test of crash-energy management passenger rail equipment; D. Tyrell et al.; Proceedings of the 2005 ASME/IEEE Joint Rail Conference, 2005; pp. 107-116; Year: 2005; IEEE Conferences.*

International Search Report and Written Opinion for application No. PCT/US2016/060112 dated May 19, 2017.

* cited by examiner

VEHICLE SEAT WITH ANGLE TRAJECTORY PLANNING DURING LARGE EVENTS

TECHNICAL FIELD

Aspects and implementations of the present disclosure are directed generally to payload suspension, and in some examples, more specifically to vehicle seats and methods for vehicle roll or pitch compensation.

BACKGROUND

In a Cartesian coordinate system (X, Y, and Z directions) a payload held by a supporting platform may be subject to motion in various directions. For example, an occupant positioned upon a vehicle seat, an occupant positioned within a wheelchair, or an occupant within a neonatal incubator, may be subject to motion in up to six degrees of freedom, including translation and rotation about each of a roll, pitch, and yaw axis. Due to uneven earth surfaces, the payload often experiences disturbances in travel when a vehicle attached to the supporting platform encounters obstructions. In particular, disturbances as a result of surface condition can be especially dramatic when the supporting platform includes a rigid or stiff suspension system, such as those typically found in tractors and other heavy machinery.

SUMMARY

In accordance with aspects of the present disclosure, there are provided systems and methods for actively isolating a payload from a disturbance. For example, there are provided a vehicle seat, a seat system for a vehicle, and methods for controlling rotation of a vehicle seat about one or more axes, such as a roll or a pitch axis. In one example, a seat system includes a seat positioned at a desired angle relative to a floor of the vehicle, and a controller configured to generate a command signal to instruct an actuator coupled to the seat to adjust the desired angle to compensate for movement of the vehicle. Accordingly, various implementations provide systems and methods for actively insulating a payload, such as an occupant of a vehicle seat, from movement and disruptive forces. In particular, several aspects of the present disclosure scale the command signal provided to a platform supporting a payload to progressively and smoothly transition rotation of the platform to and from a maximum command angle, and to avoid interference between the payload, or a platform on which the payload is positioned, and a structure enclosing the platform during roll. Such aspects and implementations provide a more isolated and disturbance-free travel experience for the payload. While various aspects and implementations are described herein with reference to a vehicle seat or a vehicle seat system, further aspects and implementations may include other platforms systems for supporting a payload sensitive to disturbance, such as wheelchairs, gurneys, beds, neonatal incubators, and heavy machinery.

According to one aspect, provided is a method of controlling seat movement in a vehicle. In one example, the method includes receiving a signal from at least one sensor positioned to detect movement of the vehicle, generating a command signal to instruct an actuator coupled to the seat to move the seat relative to a vehicle centerline, determining whether the command signal will cause the seat to exceed a limit, scaling the command signal to conform movement of the seat to movement of the floor of the vehicle within the limit, and providing a force command to the actuator to move the seat based on the scaled command signal.

In one example, scaling the command signal includes causing the command signal to transition to a maximum command angle and transition from the maximum command angle. In a further example, causing the command signal to transition to the maximum command angle includes calculating an index according to:

$$\frac{(\text{ideal command signal} - \text{saturation threshold})}{(\text{maximum command angle} - \text{saturation threshold})},$$

wherein the saturation threshold includes a command angle of the command signal beyond which scaling begins, and determining a first scaling factor based at least in part on the calculated index. In one example, the index includes an index to an attenuation table having a plurality of scaling factors, and causing the command signal to transition to a maximum command angle further includes referencing the attenuation table based on the calculated index. In a further example, the plurality of scaling factors include a range of values based on a ¼ sine wave.

According to an example, causing the command signal to transition to a maximum command angle further includes scaling the command signal according to:

saturation threshold+((maximum command angle−saturation threshold)*first scaling factor).

In one example, causing the command signal to transition from the maximum command angle includes identifying a peak value of movement of the vehicle based on a previous ideal command signal. In a further example, causing the command signal to transition from the maximum command angle further includes generating a second scaling factor according to:

$$\frac{\text{command signal}}{\text{ideal command signal}},$$

and scaling the command signal according to:

second scaling factor*ideal command signal.

According to an example, the seat is positioned to move along a vertical axis extending orthogonally from the floor of the vehicle, and scaling the command signal includes limiting movement of the seat so as to prevent interference with an interior of the vehicle. In a further example, the method includes determining a maximum command angle for the command signal based on at least the position of the seat along the vertical axis extending orthogonally from the floor of the vehicle. In an example, scaling the command signal further includes determining the command signal has reached the maximum command angle, and providing a force command to the actuator includes generating a force command so as to cause the actuator to stop movement of the seat at the maximum command angle.

According to another aspect, provided is a seat system for a vehicle. In one example, the system includes a seat a support structure coupled to the seat and including an actuator configured to move the seat at a command angle relative to a floor of the vehicle responsive to movement of the vehicle, at least one sensor positioned to detect movement of the vehicle, and a controller configured to receive a signal from the at least one sensor, generate a command signal to instruct the actuator to move the seat relative to a floor of the vehicle, determine whether the command signal will cause the seat to exceed a limit, scale the command signal to conform to movement of the vehicle within the limit, and provide a force command to the actuator to move the seat based on the scaled command signal.

In one example, the controller is configured to scale the command signal by causing the command signal to transition to a maximum command angle and transition from the maximum command angle. In a further example, the controller is further configured to calculate an index according to:

$$\frac{\text{(ideal command signal} - \text{saturation threshold)}}{\text{(maximum command angle} - \text{saturation threshold)}},$$

wherein the saturation threshold includes a command angle of the command signal at which scaling begins, and determine a first scaling factor based at least in part on the calculated index.

In one example, the index includes an index to an attenuation table having a plurality of scaling factors, and causing the command signal to transition to a maximum command angle further includes referencing the attenuation table based on the calculated index. In a further example, the plurality of scaling factors include a range of values based on from a ¼ sine wave. According to an example, the controller is configured to cause the command signal to transition to a maximum command angle according to:

saturation threshold+((maximum command angle− saturation threshold)*first scaling factor).

In one example, the controller is further configured to identify a peak value of movement of the vehicle based on a previous ideal command signal. In a further example, the controller is further configured to generate a second scaling factor according to:

$$\frac{\text{command signal}}{\text{ideal command signal}},$$

and scale the command signal according to:

second scaling factor*ideal command signal.

According to one example, the seat is positioned to move along a vertical axis extending orthogonally from the floor of the vehicle, and the controller is configured to restrict movement of the seat so as to prevent interference with an interior of the vehicle. In a further example, the controller is configured to determine a maximum command angle for the command signal based on at least the position of the seat along the vertical axis extending orthogonally from the floor of the vehicle. According to one example, the controller is configured to scale the command signal by determining the command signal has reached the maximum command angle, and provide a force command to the actuator so as to cause the actuator to stop movement of the seat at the maximum command angle.

According to an aspect, provided is a vehicle seat. In one example, the vehicle seat includes a seat positioned at a command angle relative to a floor of the vehicle, and a controller configured to generate a command signal to instruct an actuator to move the seat relative to the floor of the vehicle responsive to movement of the vehicle, determine whether the command signal will cause the seat to exceed a limit, and scale the command signal to conform to movement of the vehicle within the limit.

In one example, the controller is configured to generate a force command to move the seat based on at least the scaled command signal. According to one example, the controller is configured to scale the command signal by causing the command signal to transition to a maximum command angle and transition from the maximum command angle. In an example, the seat is positioned to move along a vertical axis extending orthogonally from the floor of the vehicle, and the controller is configured to restrict movement of the seat so as to prevent interference with an interior of the vehicle. In a further example, the controller is configured to determine a maximum command angle for the command signal based on at least the position of the seat along the vertical axis extending orthogonally from the floor of the vehicle. According to an example, the controller is configured to scale the command signal by determining the command signal has reached the maximum command angle.

Still other aspects, examples, and advantages of these exemplary aspects are discussed in detail below. Further implementations may include means for performing any of the processes recited herein. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

DETAILED DESCRIPTION

Figure 1B:
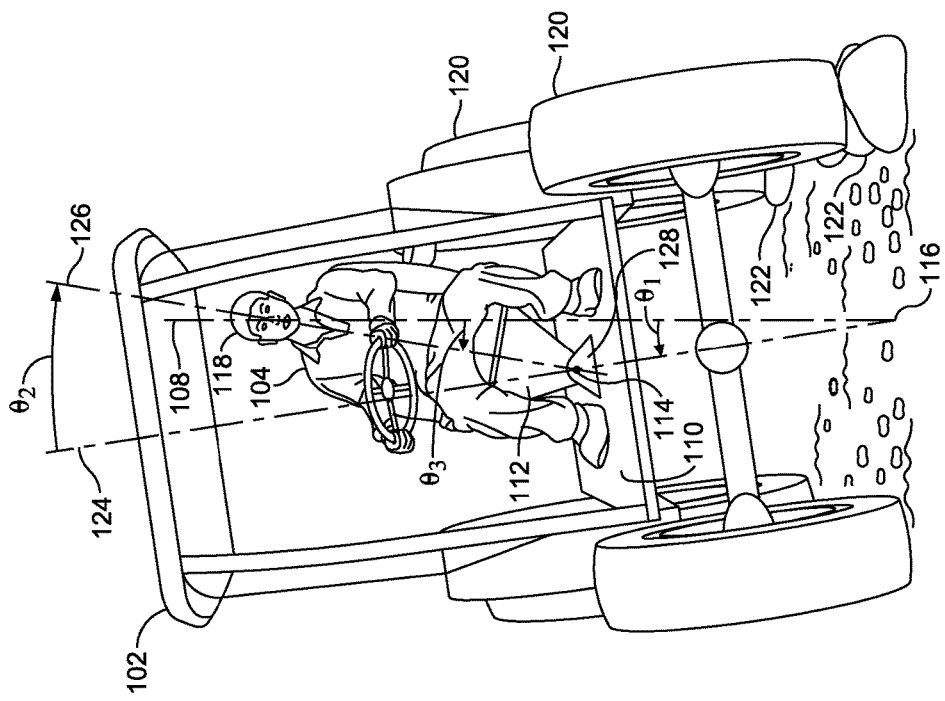
FIG. 1B is an illustration of the vehicle of FIG. 1A experiencing a roll event.

Aspects and implementations disclosed herein are not limited to the details of construction and the arrangement of components set forth in the following description or illustrated in the drawings. Aspects and implementations disclosed herein are capable of being practiced or of being carried out in various ways.

In accordance with aspects of the present disclosure, there are provided systems and methods for actively isolating a payload supported by a platform from a disturbance. In at least one example, this may include a vehicle seat, a seat system for a vehicle, and methods for controlling rotation of a vehicle seat. In particular, during large roll or pitch events, such as traveling into a curb at an angle, systems discussed herein actively control the roll (or pitch) of the platform by generating a command signal and issuing force commands to an actuator that can induce roll (or pitch) forces into the platform to reduce the roll (or pitch) induced as a result of the roll (or pitch event). Within the example vehicle seat system provided, aspects and examples isolate an occupant of the vehicle from one or more rotations or translations about a pitch or roll axis of the vehicle during travel. While various aspects and implementations are described herein with reference to a vehicle seat or vehicle seat system, further aspects and implementations may include other systems and apparatuses for supporting a payload sensitive to disturbance.

Figure 1A:
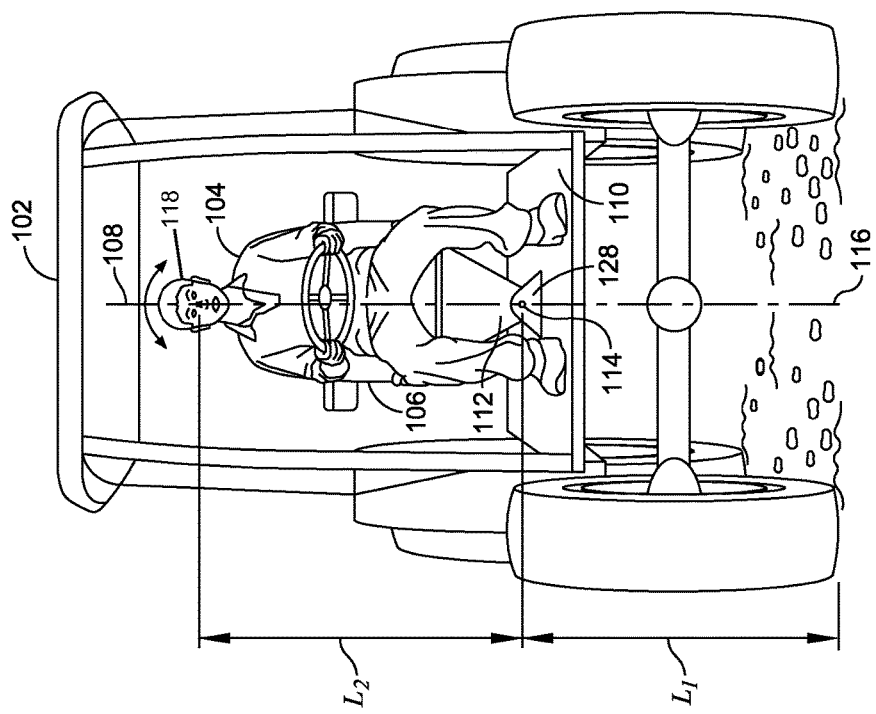
FIG. 1A is an illustration of a vehicle.

Several examples discussed herein include a vehicle seat and a seat system for a vehicle. FIGS. 1A and 1B illustrate an example seat and seat system for a vehicle according to several implementations. In particular, FIG. 1A shows a vehicle 102 in the form of a tractor traveling on a substantially level surface, and FIG. 1B shows the tractor 102 encountering a roll event at a vehicle roll angle of $\theta_1$. It is appreciated that portions of the tractor 102 shown in FIGS. 1A and 1B have been omitted to facilitate description of various implementations. In FIGS. 1A and 1B, a person 104 is shown sitting in the seat 106 in a substantially vertical orientation along an imaginary reference vertical centerline 108 which passes through the body of the person 104 who is sitting in the seat 106. In this example, the vertical centerline 108 bisects the person 104 and the seat 106 when both the seat 106 and the vehicle 102 are in a nominal, level horizontal orientation as shown in FIG. 1A. This is because the seat 106 is substantially symmetrical as viewed in FIG. 1A. In other types of vehicles, the seat 106 may be located to the left or right of the vertical centerline 108.

The seat 106 is secured to the floor 110 of the vehicle via a support structure 112. The support structure 112 includes a pivot 128 which permits the seat 106 to move/rotate relative to the vehicle 102 about an axis 114 which is substantially parallel to a direction in which the vehicle 102 is moving when the vehicle 102 is moving in a straight line. FIGS. 1A and 1B show the axis 114 located at a distance below the seat 106, and in various implementations the axis 114 may be located higher or lower than shown. The axis 114 is fixed relative to the vehicle 102. In various implementations the vehicle 102 may roll about a second axis 116 which is substantially parallel with the axis 114 and the direction in which the vehicle 102 is moving.

As shown in FIGS. 1A and 1B, a distance L1 represents the length between the axis 114 and the second axis 116. A second distance, L2, represents the length between the axis 114 and a center of a head 118 of the occupant 104 of the vehicle 102. In various implementations, the top end of L2 will reside at or above a position associated with the head of a person sitting in the seat, and for example, may be in a range of 3-5 feet.

In FIG. 1B, the left tires 120 of the vehicle 102 have hit an obstruction 122 in the surface over which the vehicle 102 is traveling, causing the vehicle 102 to rotate counter-clockwise (when viewed from the front). Rotation about the axis 116 is an acceptable small angle approximation for the rotation of the vehicle 102 about the bottom of the right tires and is used for symmetry. The vehicle 102 has approximately rotated by the angle $\theta_1$, which represents the angle between the vertical centerline 108 and a vehicle centerline 124. If the seat 102 is not positioned at the center of the vehicle 102 (i.e., positioned to one or the other side of the center), then $\theta_1$ is determined by the rotation of the vehicle centerline 124 from the nominal position in FIG. 1A to a rotated position (e.g., in FIG. 1B). In several implementations, when the vehicle 102 rotates counter-clockwise the seat 106 is rotated about the axis 114 clockwise (opposite the direction of roll of the vehicle 102). The seat 106 may be rotated by an actuator coupled to the support structure 112. Similarly, when the vehicle 102 rotates clockwise the seat 106 is rotated about the axis 114 counter-clockwise. In both implementations, a controller in communication with at least the actuator provides a force command to cause the actuator to rotate the seat by the angle $\theta_2$, which is the angle between the vehicle centerline 124 and a seat centerline 126.

In various implementations, the angle $\theta_2$ is determined by the controller according to: $\theta_2$, $\theta_1*(1+L_1/L_2)$. In some implementations, locating the axis 114 close to the floor 110 is preferable because $\theta_2$ increases when $L_1$ increases relative to $L_2$. Accordingly, larger rotations would be required to compensate for a fixed amount of roll if the height of the axis 114 is increased from the floor 110. As a result, the person 104 is rotated about a position to substantially reduce or minimize side-to side and/or front/back movement. In various implementations, the head 118 of the occupant remains substantially on the original vertical centerline 108. Further systems and methods for reducing acceleration of an occupant's head in a horizontal direction due to disturbances in road surface may be done by employing the techniques described in U.S. Pub. No. 2014/0316661, titled "SEAT SYSTEM FOR A VEHICLE," which is hereby incorporated by reference herein in its entirety.

Figure 2:
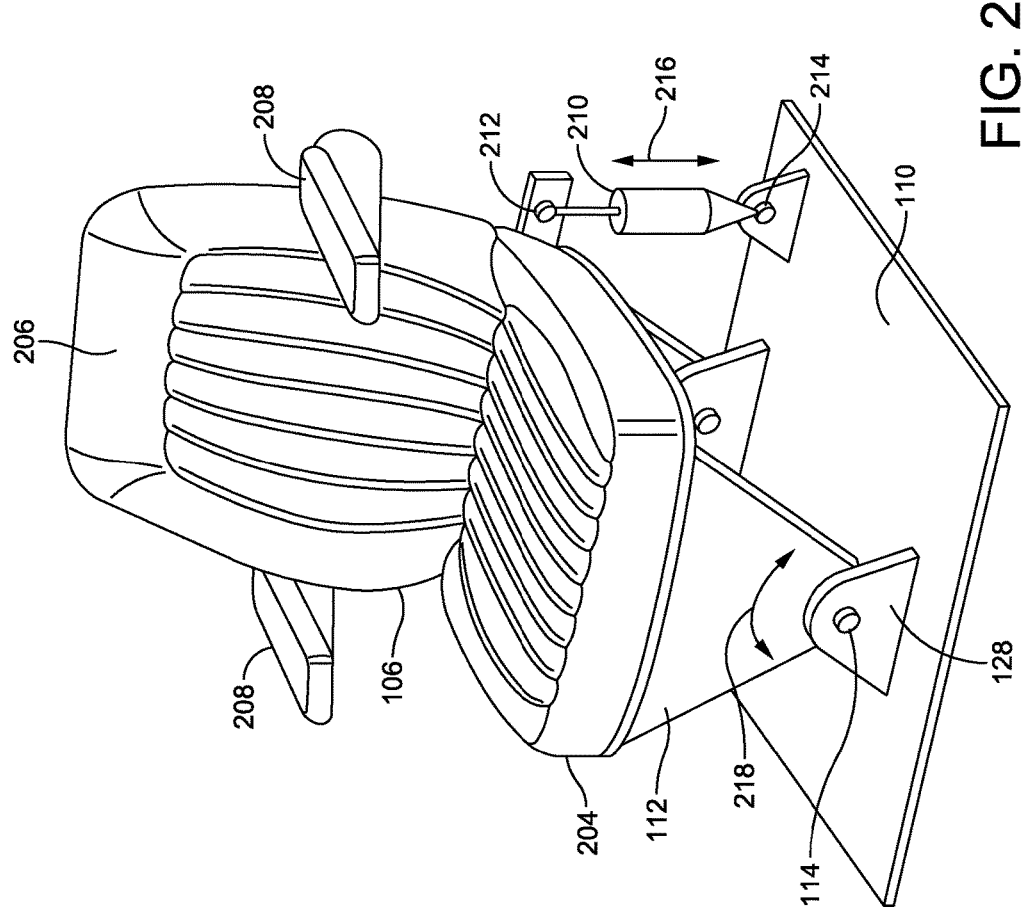
FIG. 2 is an illustration of an example vehicle seat and vehicle seat system according to various aspects discussed herein.

Turning now to FIG. 2 with continuing reference to FIGS. 1A-1B, shown is one example of a vehicle seat system including a vehicle seat, such as vehicle seat 106 shown in FIGS. 1A and 1B. The seat 106 is shown with a bottom 204 and a seat back 206 which is connected to the bottom 204. A pair of arms 208 extends forward from the seat back 206. An advantage of this seat system is that any impact of the arms 208 against a torso of the person 104 due to side-to-side rocking of the vehicle 102 will be substantially reduced (or minimized). A similar improvement will occur on the seat back 206 whereby the lateral translation of the seat back 206 relative to a person's back will also be substantially reduced. A linear actuator 210 is pivotally connected to the support structure 112 (at a location 212) and can interact with the seat 106 to cause the seat 106 to rotate about the axis 114. In this example, the linear actuator 210 is also pivotally connected to the floor 110 of the vehicle at a location 214. The linear actuator 210 is extended or retracted in the direction of a two-headed arrow 216 to cause the seat 106 to rotate about the axis 114 in the direction of a two-headed arrow 218. The linear actuator 210 can be, for example, an electromagnetic linear motor, a hydraulic cylinder, or a pneumatic cylinder. The linear actuator 210 instead can be some other type of actuator such as a rotary actuator (electromagnetic, hydraulic, or pneumatically powered) that is coupled between the seat 106 and the floor 110. Any type of actuator can be directly coupled to the seat 106 or it may act through some type of gear train, linkages or other transmission mechanism. The actuator 210 can be connected to a different portion of the support structure 112, or seat 106, and a different portion of the vehicle 102 (other than the floor 110, e.g. a wall of the driver compartment). Control of the actuator 210 is discussed below with reference to at least FIGS. 3-7.

The seat 106 is shown with only a single degree of freedom about the axis 114 (a roll axis) relative to the vehicle 102. This single degree of freedom could instead be about a pitch axis, a yaw axis, or about a plurality of axis (i.e., roll, pitch, and/or yaw). In this case, the axis 114 is oriented front-to-back as viewed in FIG. 1A and allows the seat 106 to be controlled for side to side rolling. In another example, the seat 106 may be outfitted with one or more additional actuators (not shown) to provide movement of the seat 106 in one or more additional degrees of freedom. For example, instead of mounting the intermediate support structure 112 to the floor 110, the intermediate support structure 112 can be mounted to a platform (not shown) which is moved up and down in the vertical direction by an additional actuator to reduce the vertical vibrations felt by the driver as the vehicle travels over a road (or this vertical actuator can be interposed between the structure and the seat). An example of this type of vertical active suspension system is shown in U.S. Pat. No. 8,095,268, titled "ACTIVE SUSPENDING", which is incorporated herein by reference in its entirety. The vertical active suspension system can be operated independently of the rotating seat 106. The $L_2$ distance (FIGS. 1A and 1B) will vary with the motions associated with a vertical isolation mechanism. This effect can be included in the processor calculations based on inputs from a sensor which detects a distance between the platform and the floor. In addition, the vertical isolation system can be used to offset any potential raising or lowering of the head of the person due to the combined rotation of the vehicle (e.g. relative to the ground), and rotation of the seat relative to the vehicle.

Figure 3:
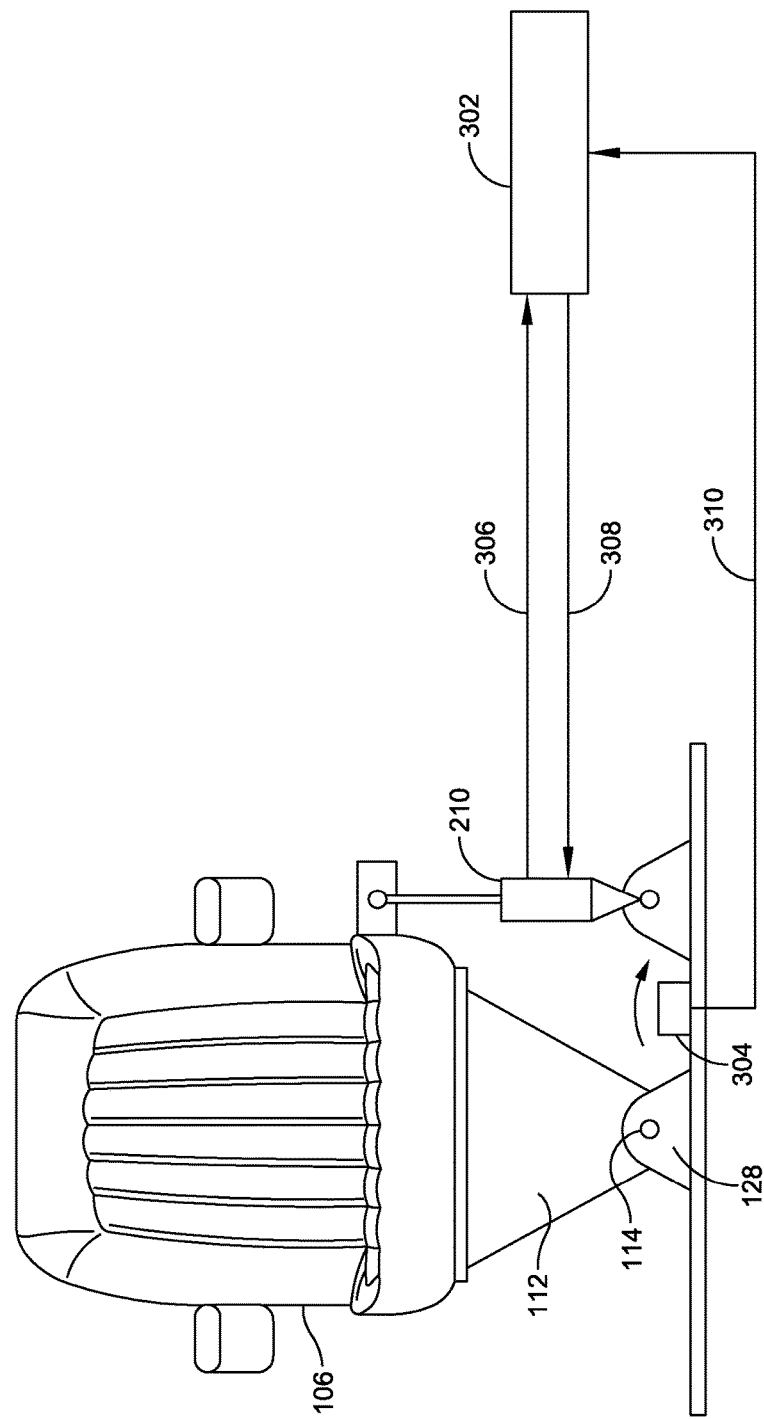
FIG. 3 is a further illustration of an example vehicle seat and vehicle seat system according to various aspects discussed herein.

Turning to FIG. 3, operation of the actuator 210 is controlled by a controller 302. A sensor 304 can measure an aspect of motion which in this example is a roll rate of the vehicle. The controller 302 receives a signal (i.e., input) from the sensor 304 in the form of roll rate data via a bus 310. The controller 302 calculates the integral of the roll rate data to determine an instantaneous vehicle roll angle $\theta_1$ (FIG. 1B). The controller 302 then uses $\theta_1$ in the equation given above along with $L_2$ and $L_1$, and generates a command signal including the instantaneous command angle $\theta_2$ (FIG. 1B). Next, the controller 302 uses a look-up table to determine the desired actuator position in order to achieve the calculated $\theta_2$. The actuator position look-up table (and other look-up tables discussed herein, such as the maximum command angle look-up table and attenuation look-up table discussed below) may include any array that replaces a runtime computation with an indexing operation. For example, the actuator position look-up table may include an array of pre-calculated and indexed actuator positions stored in static program storage. Note that the controller 302 receives position data from the actuator 210 via a bus 306. The position data is indicative of a position of the actuator 210 which is correlated to a position of the seat 106 about the axis 114. As such, the controller 302 is informed of the current position (e.g., displacement) of the actuator 210 when generating the command signal. It should be noted that the particular control law used by the processor to control $\theta_2$ is not important, and various control laws such as PI, PID, or other known control laws etc. can be used in the implementations described herein.

The controller 302 then issues a force command to the actuator 210 via a bus 308 which causes the actuator 210 to move to the desired actuator position. By successively repeating these steps, the controller 302 utilizes input from the sensor 304 to determine a desired motion of the seat 106 about the axis 114, and then operates the actuator 210 to cause the desired motion of the seat 106 about that axis. This results in a substantial reduction (or minimizing) of the acceleration of a person's head sitting in the seat 106 in a substantially horizontal direction. Preferably the controller 302 controls motion of the seat 106 in order to reduce displacement of a virtual pivot point along the reference vertical centerline 108 as the vehicle 102 is rotated (e.g., about the axis 116 in FIG. 1B). This example is advantageous in that it (a) is substantially insensitive to lateral accelerations caused by turning (when the vehicle makes a left or right turn) and gravity, and (b) requires minimal motion sensors. This arrangement assumes that there is a stationary roll center height (i.e., $L_1$ does not vary).

If it is desired to calculate $L_1$ continuously in real time as the vehicle 102 is moving, a lateral accelerometer (not shown) can be provided on, for example, the vehicle 102 or the seat 106. It is preferable that this accelerometer is located at substantially the same height (or location) as the axis 114. The controller 302 receives inputs from the lateral accelerometer and the sensor 304, and then calculates $L_1$ using the equation $L_1$=lateral velocity/roll rate where the lateral velocity is calculated by integrating the lateral acceleration signal. It should be noted that preferably gravity correction is done on the output of any lateral accelerometers described in this application. This means that the component of gravity coupled into the lateral accelerometer as the vehicle 102 and/or seat 106 rotates is taken into consideration.

Various aspects and implementations discussed herein may also permit isolation of the payload from large roll events, during which a limit of travel of the platform is exceeded. For example, during a large vehicle roll event, the seat 106 may be rotated to its travel limit and not be able to rotate further to address the full vehicle roll angle. Furthermore, abrupt saturation of the command signal at a limit of travel of the seat 106 may result in an unpleasant riding experience for the occupant. Accordingly, various aspects and implementations progressively and gradually scale the command signal such that the seat 106 transitions smoothly to and from the limit of travel.

Figure 4:
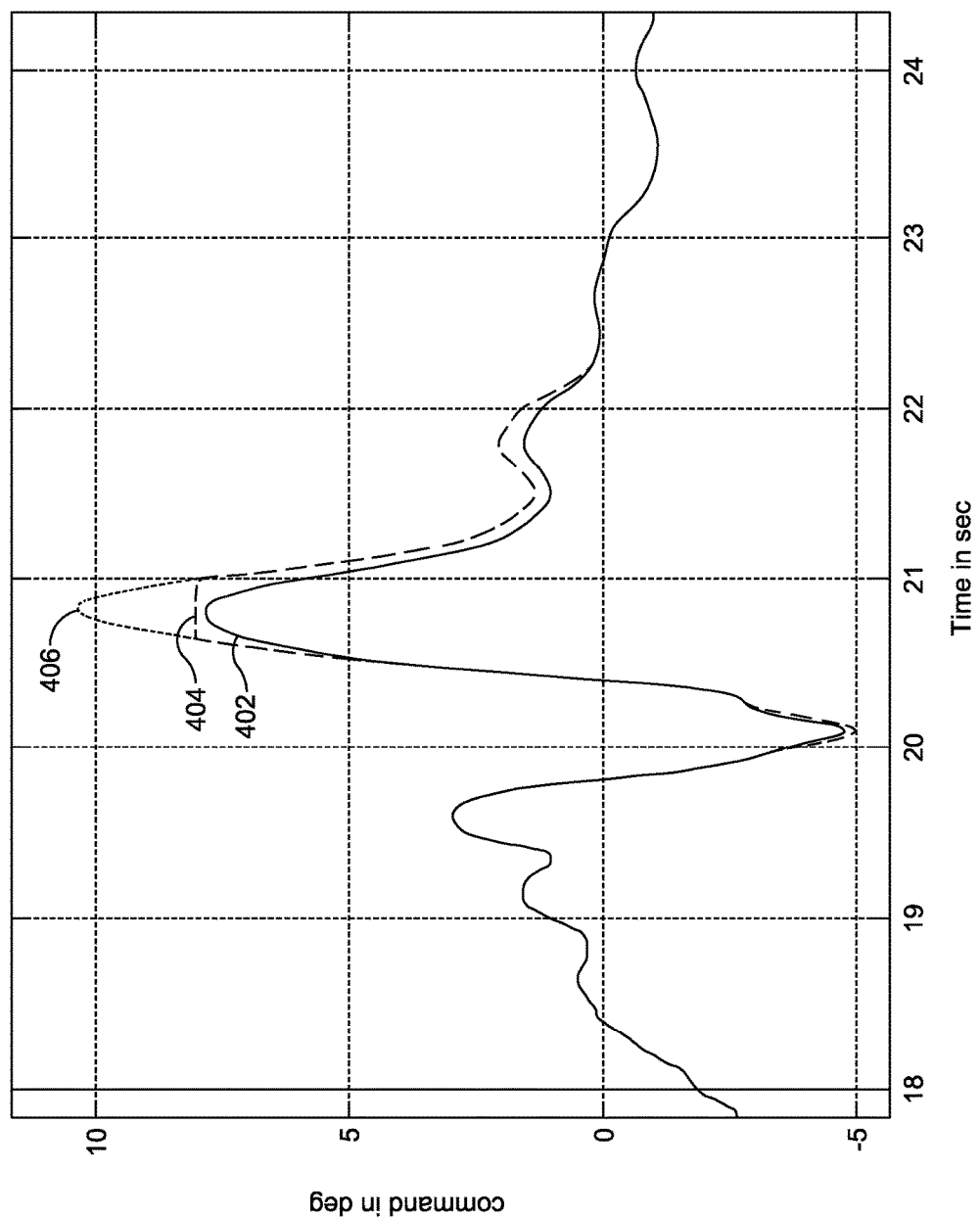
FIG. 4 is a graphical illustration of command signals.

Turning to FIG. 4, shown is a graphical illustration of a command signal for instructing an actuator (e.g., actuator 302 discussed with reference to FIG. 3) over a time span in which a large roll event occurs. For purposes of explanation, a large roll event may occur when any large disturbance in the surface over which the vehicle is traveling causes a large rotation about the pitch or roll axis of the vehicle, such as when a right or left tire of the vehicle encounters a curb or other large disturbance (e.g., ditch, culvert, etc.).

A first trace 402 represents a scaled command signal for instructing the actuator, a second trace 404 represents an un-scaled command signal for instructing the actuator, and a third trace 406 represents an ideal command signal generated by the controller. As used herein, the ideal command signal refers to the command signal generated if there is no limit of travel of the seat. As described above, the command signal includes a series of instantaneous command angles at which the seat may be positioned during a roll event. In various implementations, the controller may generate a command force based on the command signal to drive the actuator to achieve a desired seat position to compensate for vehicle roll. FIG. 4 shows a limit of travel at a maximum command angle of ±8 degrees; however, it is appreciated that in various implementations the maximum command angle may be greater or less than ±8 degrees, and in some instances may depend on the distance between the seat and the floor of the vehicle or the particular implementation. For example, a vehicle seat may have a greater maximum command angle than a neonatal incubator.

Various saturation command signal techniques create an abrupt "flat top" period in the command signal when the command angle saturates at a maximum command angle. Such an instance is indicated by the second trace 404 at approximately 8 degrees during the time span of approximately 20.8-21 seconds. This abrupt transition may result in an unnatural feeling and an uncomfortable rider experience. Accordingly, in various implementations when the maximum command angle is approaching or nearly reached, the controller scales the command signal to gradually saturate at the limit of travel and wait for the vehicle roll to reach the maximum roll angle. Such an instance is demonstrated by the first trace 402 between approximately 5 degrees and 8 degrees during the time span of 20.5-21 seconds. Once the maximum roll angle of the vehicle has been reached, the controller scales the command signal to gradually decrease away from the limit of travel according to the shape of the ideal command signal. Such an effect is shown in the first trace 402 when the command signal leaves approximately 8 degrees. In contrast to the second trace 404, which has sharp and distinct edges when reaching and leaving 8 degrees, in various implementations the controller scales the command signal to "round" the corners of the command signal instead of an imposing a discontinuity.

Figure 5:
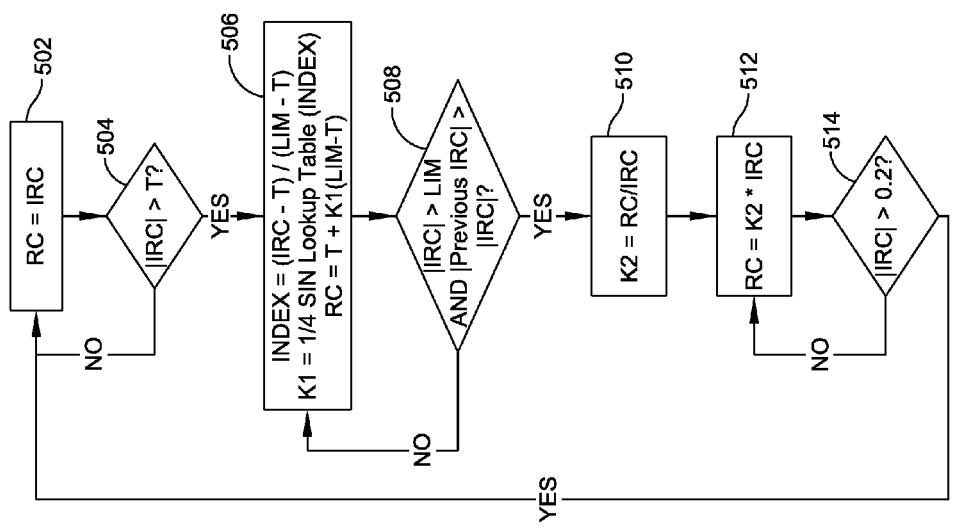
FIG. 5 is an illustration of a flow diagram for controlling vehicle seat movement according to various aspects discussed herein.

Accordingly, in various implementations the controller scales the command signal such that movement of the seat conforms to movement of the floor of the vehicle within the limit of travel of the seat. In particular, the controller may scale the command signal based on the ideal command signal, a previous sample of the ideal command signal, a saturation threshold, and one or more maximum command angles. While discussed herein as equal in a positive (+) and negative (−) direction, in further examples the maximum command angle may have a different magnitude in the positive and negative directions. This is often the case when the vehicle seat is not placed in the center of the vehicle, or the vehicle seat is not substantially symmetrical. One example of a control process for controlling seat movement in a vehicle during a large roll event is shown in the block diagram illustrated in FIG. 5. FIG. 5 is described with continuing reference to the vehicle seat and vehicle seat system discussed above with reference to FIGS. 1-3.

In FIG. 5, RC represents the command signal, IRC represents the ideal command signal, T represents the saturation threshold, LIM represents the maximum command angle, K1 represents a first scaling factor, and K2 represents a second scaling factor. At block 502, the controller is configured to set the command signal approximately equal to the ideal command signal. In various implementations the ideal command signal includes command angles generated according to $\theta_2 = \theta_1 *(1+L_1/L_2)$, as discussed above. While discussed herein as a discrete value, it is appreciated that in various implementations the angle $\theta_2$ is continuously generated in real-time when the vehicle is in motion.

Subsequent generation of the command signal, the controller is configured to determine whether the command signal will cause the seat to exceed the saturation threshold. As used herein, the saturation threshold defines a seat roll angle beyond which the controller is configured to begin scaling the command signal. For instance, the saturation threshold shown in FIG. 4 is approximately 5 degrees; however, in further implementations it may be greater or less than 5 degrees. In various implementations, the saturation threshold may be determined by the controller, and based on one or more received inputs, such as a sensed height of the vehicle seat. Scaled operation of the command signal and the associated modified behavior of the controller when the saturation threshold has been exceeded ensure that the command angle is only scaled during the occurrence of large roll events.

Accordingly, at decision block 504 the controller is configured to determine whether the ideal command signal will exceed (i.e., is greater in magnitude) than the saturation threshold. If the ideal command signal will not cause the saturation threshold to be exceeded, the controller continues equating the command signal and the ideal command signal. However, if the controller determines that the ideal command signal will cause the saturation threshold to be exceeded, the controller begins to scale the command signal to maintain movement of the vehicle seat within the limit of travel. While described above as performed subsequent to generation of the command signal, in various further implementations the controller may determine whether the saturation threshold will be exceeded while the command signal is generated by the controller, and the force command is supplied to the actuator.

At block 506, the controller is configured to generate an index and determine the first scaling factor K1 for the command signal. While various implementations are possible, in one particular example the index includes an index to an attenuation look-up table having a plurality of scaling factors. The controller may determine the first scaling factor K1 by referencing the attenuation table based on the index. Scaling factors are applied by the controller to the command signal to progressively transition the command signal to and/or from the maximum command angle, the first scaling factor K1 being applied to transfer the command signal to the maximum command angle, and the second scaling factor K2 being applied to transfer the command signal from the maximum command angle. As shown in FIG. 5, the index may be calculated according to:

$$\frac{\text{(ideal command signal} - \text{saturation threshold)}}{\text{(maximum command angle} - \text{saturation threshold)}}.$$

As discussed above, the maximum command angle includes the command angle at which the limit of travel of the seat is reached. For example, the maximum command angle is shown in FIG. 4 as ±8 degrees.

Having calculated the index, the controller references the attenuation table, or other repository of scaling factors, to determine a scaling factor corresponding to the calculated index. In various implementations the scaling factor is based on a ¼ sine wave. The value of the calculated index may range from 0 to infinity and correspond to a scaling factor of a value of 0 to 1. When the index is 0, the first scaling factor is also 0. When the index is between a value of 0 and 1.55, the scaling factor may follow a ¼ sine wave, increasing in value proportionate to the first ¼ of a sine wave as the index nears 1.55. When the index is equal to or greater than 1.55, the first scaling factor is set equal to 1. Further performed by the controller in block 506 is scaling of the command signal. In several implementations the first scaling factor is applied to the command signal according to:

saturation threshold+((maximum command angle− saturation threshold)*first scaling factor).

In various implementations, the controller may generate a force command to cause the actuator to reposition the seat based on the resulting scaled command signals as discussed above.

At decision block 508, the controller is configured to determine if the command signal has reached the maximum command angle, and if the command angle at a previously preceding time ("Previous IRC") is greater than the current ideal command signal (i.e., the ideal command signal "IRC"). If both of these conditions are satisfied, the controller performs one or more actions to calculate the second scaling factor, and gradually and progressively decreases the command signal away from the maximum command angle. If either, or both, of these conditions are not satisfied (i.e., the ideal command signal has not exceeded the maximum roll angle and/or the previous ideal command signal does not exceed the ideal command signal), the controller returns to block 506 to calculate a new index and first scaling factor. Accordingly, the controller is configured to identify a peak value of movement of the vehicle based on the previous ideal command signal. As shown in FIG. 5, this process may be continually repeated by the controller until each of the conditions shown in 508 has been satisfied.

At block 510, the controller is configured to generate a second scaling factor to progressively transition the command signal from the maximum command angle. In several implementations, the controller is configured to scale the command signal according to:

$$\frac{\text{command signal}}{\text{ideal command signal}}.$$

At block 512, the controller is further configured to further scale the command scale based at least on the generated second scaling factor K2. FIG. 5 shows the controller further scaling the command signal according to:

second scaling factor*ideal command signal.

In various implementations the controller provides a force command to the actuator to move the seat based on the scaled command signal responsive to scaling the command signal with the second scaling factor. Such implementations provide the occupant of the seat with a more natural-feeling vehicle roll compensation.

At decision block 514, the controller may be configured to determine whether the ideal command signal has returned to a substantially normal position, for example, less than 0.2 degrees. It is appreciated that 0.2 degrees is offered as an example and other values (e.g., 0.1, 0.3, 0.5, 1.0 degrees) may be employed in alternative implementations. If the controller determines that the ideal command signal is less than 0.2 degrees, the scaling process returns to block 502. However, if the controller determines that the ideal command signal is not less than 0.2 degrees, the controller returns to block 512, and continues scaling the command signal. Accordingly, in various implementations, the controller may end the scaling process early if the ideal command signal quickly returns to the substantially normal (i.e., 0 degree) position. Further aspects and implementations of scaling the command signal are described below with reference to FIG. 7.

Several aspects and implementations also permit compensation for interference between a payload, or a platform on which the payload is supported, and obstacles within an angular path of travel during rotation of the platform. For example, in one implementation a maximum command angle of the vehicle seat discussed above may be based on the dimensions of an interior of the vehicle and other interior obstructions. In several implementations, the maximum command angle may be predetermined by the occupant or operator of the vehicle, and set at a static value (e.g., ±8 degrees). However, in further implementations the controller may automatically determine the maximum command angle and limit of travel of the seat. In such implementations, the controller may be configured to automatically determine and adjust the maximum command angle based at least in part on a position of the seat along a vertical axis extending orthogonally from the floor of the vehicle. As discussed above, in one implementation the vertical height of the seat may actively or passively change during travel. In one such active implementation, the system may include a second actuator positioned to adjust a vertical height of the seat to compensate for roll events. In such implementations, one or more sensors in communication with the controller may be positioned on the seat or interior of the vehicle so as to indicate when the limit of travel is approaching or has been reached.

Figure 6:
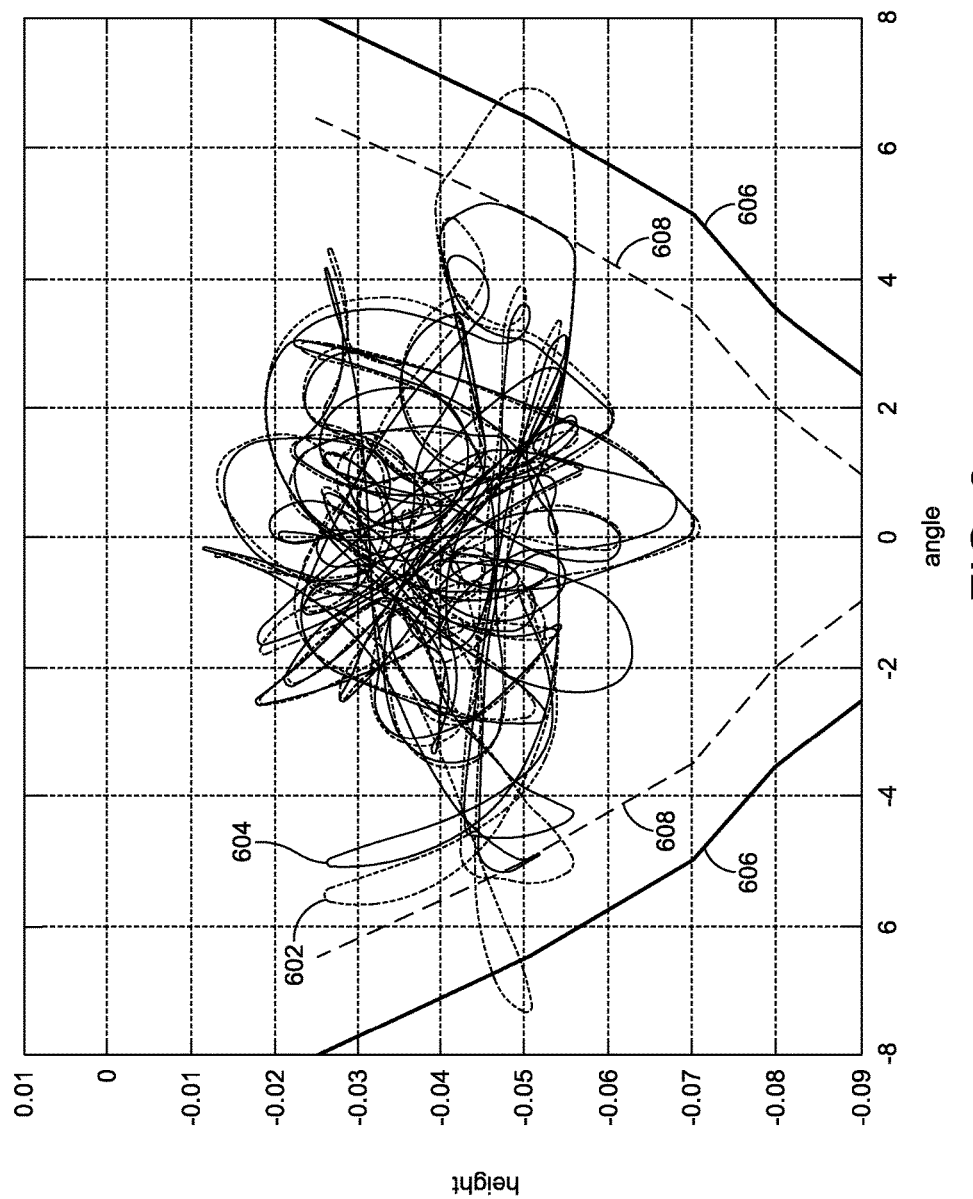
FIG. 6 is a graphical illustration of vehicle seat position.

Turning now to FIG. 6, there is illustrated a chart showing motion of a vehicle seat. FIG. 6 is discussed with continuing reference to the vehicle seat and vehicle seat systems discussed above with reference to FIGS. 1-3 and the block diagram discussed above with reference to FIG. 5. The vertical axis of the chart shows a position of the vehicle seat in meters (m), and the horizontal axis shows a command angle in degrees of the command signal generated by the controller. A first trace 602 represents motion of the seat when the proximity of the interior of the vehicle is ignored, and a second trace 604 represents motion of the seat when the maximum command angle is determined based on the position of the seat along a vertical axis extending orthogonal to the floor of the vehicle (e.g., axis 108 of FIGS. 1A-1B). A first set of roll limits 606 indicates a position at which contact with an interior of the vehicle will be made, and a second set of roll limits 608 indicates a position at which the seat will be within 20 mm of contact with an interior of the vehicle. Each set of limits may include an upper roll limit and a lower roll limit.

As illustrated in FIG. 6, during some large roll events, a force command generated by the controller may cause the actuator to position the seat at a command angle that exceeds the roll limits of the seat. For example, the first trace 502 shows that at a position of approximately −0.05 m the controller unknowingly instructs the actuator to position the seat at a command angle of approximately −7 degrees. While at some particular seat heights, this may be a safe position, at the height of −0.05 m a command angle of −7 degrees would cause a collision with the interior of the vehicle. Similarly, the first trace 502 shows that at a position of approximately −0.055 m, the controller instructs the actuator to position the seat at a command angle of approximately 6 degrees. While at a position of −0.03 m this command angle would not cause an issue, at the position of −0.055 m the actuator moves the seat into collision with the interior of the vehicle.

In contrast, various aspects and implementations discussed herein, and discussed with reference to the second trace 604, scale movement of the vehicle seat to avoid collision with an interior and other objects within the vehicle. For example, the interior of the vehicle may include armrests, doorframes, window sills, center consoles, windows, cup holders, and other objects that may limit movement of the vehicle seat (e.g., tool boxes, coolers, personal objects, luggage, etc.). In particular, the controller may be configured to determine the maximum command angle for rotating the seat based on a height of the seat along the vertical axis extending orthogonally from the floor of the vehicle. As indicated by the limits 606 and 608 shown in FIG. 6, as the height of the seat increases, the limit of travel of the seat increases, permitting a greater range of movement.

As discussed above, in several implementations the vehicle seat, or seat system, may include one or more sensors, positioned to detect proximity of the seat to the floor of the vehicle (i.e., the height of the seat). In one example, the controller is configured to determine the upper roll limit and the lower roll limit based on a signal received from the one or more sensors. The upper roll limit may include the limit of travel of the vehicle seat in a first direction about the axis 114, and the lower limit may include the limit of travel of the vehicle seat in a substantially opposite second direction about the axis 114. In further implementations, the upper roll limit and/or lower roll limit may be set at a distance from contact with the interior of the vehicle, for example, a distance of 20 mm from the interior of the vehicle. As shown in FIG. 6, the upper roll limit and lower roll limit change as the height of the seat along the vertical axis is changed. For example, at a height of −0.08 m, the corresponding upper and lower limits were determined to be approximately 2 and −2 degrees, and at a height of −0.05 m, the corresponding upper and lower limits were determined to be approximately 5 and −5 degrees.

In various implementations the controller determines the upper and lower roll limits by referencing a maximum command angle look-up table based on the signal from the sensor. For example, the controller may be configured to store in a look-up table a plurality of maximum command angles corresponding to a particular seat height along the vertical axis. Such values may be predetermined corresponding to the type, model, or make of the vehicle, or may be generated based on a scan of the vehicle by one or more sensors, such as positioning sensors configured to map an interior of the vehicle. Accordingly, the controller may be configured to reference the maximum command angle look-up table and receive a positive and negative maximum command angle based on the particular seat height. Such maximum command angles may be used to subsequently set the upper and lower limits. In further implementations, the controller may be configured to adjust the saturation threshold based on the determined upper and lower roll limits. For example, a seat positioned at a height of −0.03 m will have a much larger range of movement than seat positioned at a height of −0.07 m. Accordingly, the saturation threshold corresponding to the seat height of −0.03 m may be much larger to permit the appropriate scaling.

Figure 7:
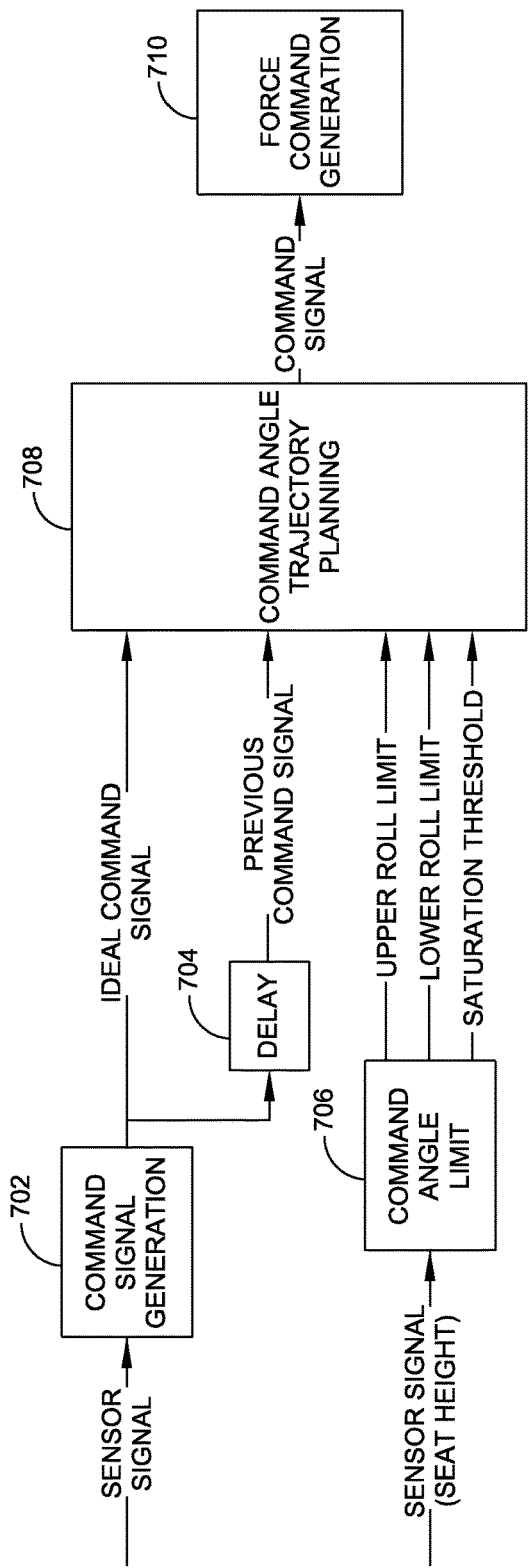
FIG. 7 is an illustration of a block diagram for controlling vehicle seat movement according to various aspects discussed herein.

FIG. 7 provides a block diagram illustrating a process flow performed by the controller of at least one implementation. As discussed above with reference to FIGS. 1-6, the controller may receive a signal from at least one sensor positioned to detect movement of the vehicle and at least one sensor positioned to determine a height of the seat. Based on at least the detected movement, at block 702 the controller is configured to perform one or more processes to generate an ideal command signal. The controller may also, based on a predetermined delay, determine a previous command signal (block 704). Subsequent, or concurrent with these processes, the controller may determine an upper roll limit, a lower roll limit, and a saturation threshold for the command signal (block 706). At block 708, all of these determinations (i.e., the ideal command signal, the previous command signal, the upper roll limit, the lower roll limit, and the saturation threshold) may be used by the controller to generate a command signal to instruct at least one actuator coupled to the seat of a vehicle to rotate the seat responsive to movement of the vehicle. The controller may generate a force command based on the command signal to cause the actuator to move the seat to a desired position (block 710). Such aspects and implementations accommodate a limit of travel of the vehicle seat, and avoid any collision between the seat or occupant and an interior of the vehicle. Accordingly, various aspects and implementations provided herein improve the comfort and safety of a traditional payload suspension system.

Figure 8:
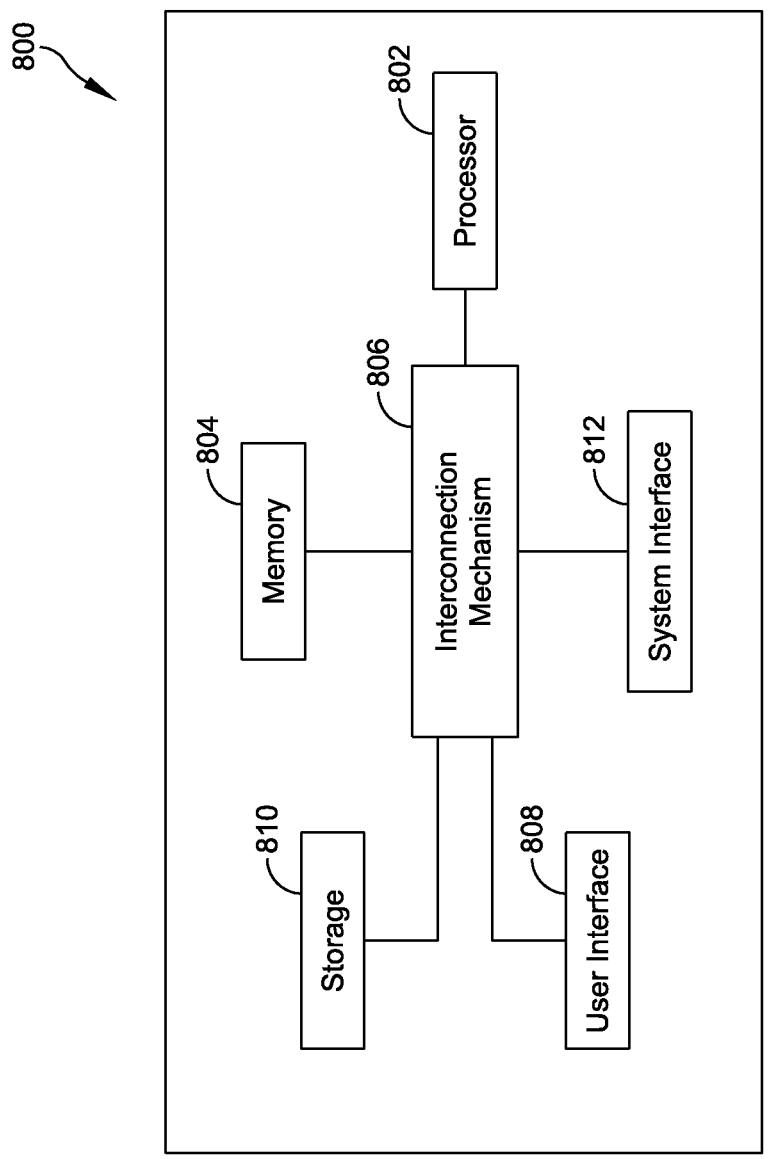
FIG. 8 is an illustration of a controller that may be used with various aspects discussed herein.

Referring to FIG. 8, there is illustrated a block diagram of a controller 800, in which various aspects and functions are practiced. FIG. 8 is described with reference to the several aspects and implementations discussed above with reference to FIGS. 1A-7. For example, the controller 800 may include the controller 302 shown in FIG. 3. As shown, the controller 800 can include one or more system components that exchange information. More specifically, the controller 800 can include at least one processor 802, a power source (not shown), a data storage 810, a system interface 812, a user interface 808, a memory 804, and one or more interconnection mechanisms 806. The controller 800 may also include a power source (not shown) that provides electrical power to other components. The at least one processor 802 may be any type of processor or multiprocessor, and for example may include a digital signal processor. The at least one processor 802 is connected to the other system components, including one or more memory devices 804 by the interconnection mechanism 806. The system interface 812 couples one or more sensors or components (e.g., actuator 210) to the at least one processor 802.

The memory 804 stores programs (e.g., sequences of instructions coded to be executable by the processor 802) and data during operation of the controller 800. Thus, the memory 804 may be a relatively high performance, volatile, random access memory such as a dynamic random access memory ("DRAM") or static memory ("SRAM"). However, the memory 804 may include any device for storing data, such as a disk drive or other nonvolatile storage device. Various examples may organize the memory 804 into particularized and, in some cases, unique structures to perform the functions disclosed herein. These data structures may be sized and organized to store values for particular data and types of data.

Components of the controller 800 are coupled by an interconnection mechanism such as the interconnection mechanism 806. The interconnection mechanism 806 may include any communication coupling between system components such as one or more physical buses. The interconnection mechanism 806 enables communications, including instructions and data, to be exchanged between system components of the controller 800.

The controller 800 can also include one or more user interface devices 808 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the controller 800 to exchange information and to communicate with external entities, such as users and other systems.

The data storage element 810 includes a computer readable and writeable data storage medium configured to store noon-transitory instructions and other data, and cant include both nonvolatile storage media, such as optical or magnetic disk, ROM or flash memory, as well as volatile memory, such as RAM. The instructions may include executable programs or other code that can be executed by the at least one processor 802 to perform any of the functions described here below.

Although not illustrated in FIG. 8, the controller 800 may include additional components and/or interfaces, such as a communication network interface (wired and/or wireless), and the at least one processor 802 may include a power saving processor arrangement.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of controlling movement of a seat in a vehicle relative to the vehicle, comprising:
   receiving a signal from at least one sensor positioned to detect movement of the vehicle;
   based at least on the received signal, determining a desired displacement value of the seat relative to the vehicle;
   determining whether the desired displacement value exceeds a threshold value;
   in response to determining that the desired displacement value exceeds the threshold value, scaling the desired displacement value to calculate a scaled displacement value that is less than the desired displacement value; and
   operating an actuator to displace the seat to the scaled displacement value.

2. The method of claim 1, further comprising:
   determining a maximum allowable displacement;
   continuously determining an actual displacement of the seat; and
   upon determining that the actual displacement of the seat at a given time equals or exceeds the maximum allowable displacement, operating the actuator to at least one of maintain and reduce the actual displacement of the seat.

3. The method of claim 1, wherein the desired displacement value is a desired angle of rotation, the scaled displacement value is a scaled angle of rotation, and the threshold value is a threshold angle, and wherein scaling the desired displacement value to determine a scaled displacement value includes:
   determining a maximum allowable angle of rotation;
   calculating an index value based on the desired angle of rotation, the threshold angle, and the maximum allowable angle of rotation; and
   determining a scaling factor based at least in part on the calculated index value.

4. The method of claim 3, wherein determining the scaling factor based at least in part on the calculated index value comprises:
   accessing an attenuation table that contains at least one scaling factor, wherein each scaling factor of the at least one scaling factor corresponds to a respective index value; and
   determining the scaling factor by identifying a specific scaling factor from the attenuation table that most closely corresponds to the calculated index value, based on the calculated index.

5. The method of claim 4, wherein the at least one scaling factor includes a range of values based on a ¼ sine wave.

6. The method of claim 3, wherein scaling the desired displacement value to determine a scaled displacement value comprises calculating the scaled angle of rotation according to equation (2), wherein T is the threshold angle, M is the maximum allowable angle, $F_1$ is the scaling factor, and S is the scaled angle of rotation;

$$S = T + (M-T) * F_1 \qquad \text{(equation 2)}.$$

7. The method of claim 1, wherein the first desired displacement value is a first desired angle of rotation of the seat relative to a vehicle centerline, the scaled displacement value is a scaled angle of rotation, and the first threshold value is a first threshold angle of rotation, and wherein scaling the first desired displacement value to determine a scaled displacement value comprises scaling the first desired angle of rotation to determine the scaled angle of rotation.

8. A seat system of a vehicle, comprising:
   a seat positioned at a first position relative to the vehicle;
   an actuator arranged to move the seat relative to the vehicle;
   a sensor configured to sense motion of the vehicle; and a controller configured to:
receive a signal from the sensor, wherein the signal corresponds to a movement of the vehicle;
in response to the received signal, generate a signal to command the actuator to move the seat to a second position relative to the vehicle;
determine whether the second position exceeds a limit; and
upon determining that the second position exceeds a limit, scale the command signal.

9. The method of claim 1, further comprising:
sensing a position of the seat relative to a floor of the vehicle; and
based on the sensed position, determining the threshold value.

10. The method of claim 2, further comprising determining the maximum allowable displacement based on at least a position of the seat relative to an axis that intersects a floor of the vehicle.

11. The method of claim 3, further comprising:
determining a maximum allowable angle of rotation;
in response to determining that an actual angle of rotation of the seat at a given time equals or exceeds the maximum allowable angle, operating the actuator so as to maintain or reduce the actual angle of rotation of the seat.

12. A seat system for a vehicle, comprising:
a seat configured to rotate relative to the vehicle;
an actuator configured to rotate the seat;
at least one sensor positioned to detect movement of the vehicle; and
a controller configured to:
receive a signal from the at least one sensor,
based on the received signal, determine a desired angle of rotation of the seat,
determine whether the desired angle exceeds a threshold angle,
in response at least to determining that the desired angle exceeds the threshold angle, scale the desired angle of rotation to determine a scaled angle of rotation;
calculate a value of a force at least partially based on the scaled angle of rotation; and
command the actuator to apply the force to the seat.

13. The seat system of claim 12, wherein the controller is further configured to:
determine a maximum allowable angle of rotation;
monitor, over a period of time, an actual angle of rotation of the seat; and
upon determining that the actual angle of rotation of the seat at a given time equals or exceeds the maximum allowable angle of rotation, command the actuator to apply an adjusted force, wherein application of the adjusted force to the seat causes the seat to maintain or reduce its actual angle of rotation.

14. The seat system of claim 12, wherein the controller is further configured to:
determine a maximum allowable angle of rotation of the seat;
calculate an index value based on the desired angle of rotation, the threshold angle, and the maximum allowable angle of rotation; and
determine a scaling factor based at least in part on the calculated index value.

15. The seat system of claim 14, further comprising a memory storing an attenuation table having a plurality of scaling factors, wherein each of at least two scaling factors of the plurality of scaling factors corresponds to an index value, and wherein the controller is configured to determine the scaling factor by identifying a specific scaling factor of the plurality of scaling factors that most closely corresponds to the calculated index value.

16. The seat system of claim 15, wherein the plurality of scaling factors include a range of values based on a ¼ sine wave.

17. The seat system of claim 15, wherein the controller is configured to scale the desired angle of rotation to obtain the scaled angle of rotation by calculating the scaled angle of rotation according to equation (2), wherein T is the threshold angle, M is the maximum allowable angle, $F_1$ is the scaling factor, and S is the scaled angle of rotation;

$$S=T+(M-T)*F_1 \quad \text{(equation 2)}.$$

18. The vehicle seat of claim 8, wherein the seat is configured to move along an axis that is fixed to the floor and intersects the floor of the vehicle, and the controller is configured to restrict movement of the seat so as to prevent interference with an interior of the vehicle.

19. The vehicle seat of claim 18, wherein the controller is configured to determine a maximum command angle based on at least a position of the seat along the axis.

20. The seat system of claim 12, wherein the seat is configured to move relative to an axis that intersects a floor of the vehicle, and the controller is configured to restrict movement of the seat to prevent interference with an interior of the vehicle.

21. The seat system of claim 20, wherein the controller is configured to determine a maximum allowable angle of rotation of the seat relative to the axis.

22. The seat system of claim 21, wherein the controller is configured to determine when the seat is rotated to an angle equal to or exceeding the maximum allowable angle, and in response to said determination, to command the actuator to cause the actuator to stop additional rotation of the seat.

23. The vehicle seat of claim 19, wherein the controller is configured to scale the command signal by determining if the command signal has reached the maximum command angle and subsequently reducing the command signal.

24. The vehicle seat of claim 8, wherein the controller is configured to generate a force command to move the seat based on at least the scaled command signal.

25. The vehicle seat of claim 8, wherein the seat is configured to rotate relative to an axis fixed to the vehicle, wherein the first position is a first angle of rotation of the seat relative to the axis, wherein the command signal specifies a desired angle of rotation, and wherein the controller is configured to scale the command signal by causing the command signal to transition to a maximum command angle and to transition from the maximum command angle.

* * * * *